W. F. Collier,
Corn Popper.

No. 111,319. Patented Jan. 31, 1871.

Witnesses
Thos. H. Dodge
A. E. Peirce

Inventor
Wm. F. Collier

United States Patent Office.

WILLIAM F. COLLIER, OF WORCESTER, MASSACHUSETTS.

Letters Patent No. 111,319, dated January 31, 1871.

IMPROVEMENT IN CORN-POPPERS.

The Schedule referred to in these Letters Patent and making part of the same.

*To all whom it may concern:*

Be it known that I, WILLIAM F. COLLIER, of the city and county of Worcester and State of Massachusetts, have invented certain new and useful Improvements in Corn-Poppers; and I do hereby declare the following to be a full, clear, and exact description of the same, reference being had to the accompanying drawing which forms a part of this specification, in which—

Figure 1:
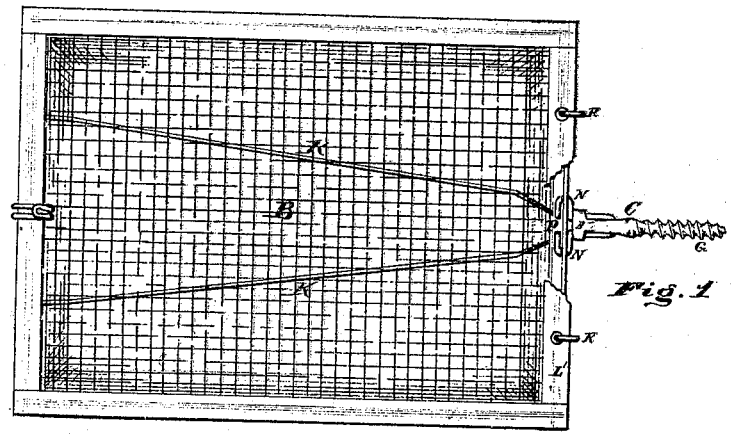
Figure 1 represents a plan view of my improved corn-popper.
Figure 2:
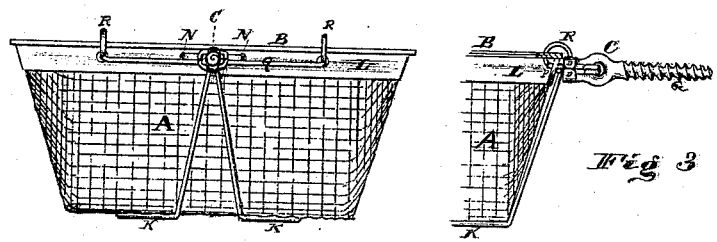
Figure 2 represents a rear view of my improved corn-popper.
Figure 3:
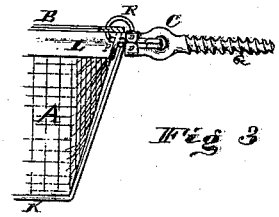
Figure 3 represents a side view of the handle-connecting device.

To enable those skilled in the art to which my invention belongs to make and use the same, I will proceed to describe it more in detail.

The nature of my invention consists—

First, in a peculiarly-constructed screw-shank for connecting the popper-box to the handle, as hereinafter described; and Second, in the combination of the screw-shank attachment with the popper-box or wires I and J, substantially as and for the purposes hereinafter set forth.

In the drawing—

The part marked A represents the popper-box;

B, the cover; and

C, the screw-shank.

Figure 5:
Figure 5 represents a perspective view of the screw-shank before the wire-connections are attached thereto.

The shank C is made of malleable iron or other suitable metal, cast in the form shown in fig. 5, the front end thereof being provided with laterally-projecting ear-pieces D at the upper and under sides of the flat vertical center-piece E.

At a short distance back from the ear-pieces D an opening, F, is formed through the central portion of the shank, beyond which the shank is rounded off and provided with a suitable screw-thread, G, by means of which it is secured to the wooden handle, which handle is not shown in the drawing, as it may be constructed in any desired form.

Figure 4:
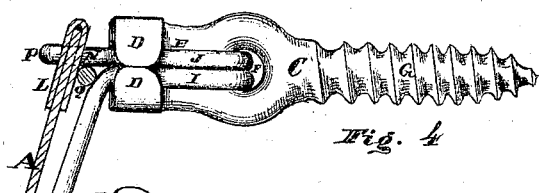
Figure 4 represents a side view of the connecting device drawn to an enlarged scale.

The popper-box A is attached to the shank C in the following manner:

Two strands of wire, I and J, are passed through the openings F, and their ends bent around to the front, parallel with the center-piece E, against which they are firmly secured by clinching down upon them the ear-pieces D, (see fig. 4.)

The ends of the wire I are then bent downward at the end of the shank and across the bottom of the popper-box A, to form guards K, and the extremities, hooked into holes formed in the binding L at the front edge of the popper-box, where they are securely clinched.

The ends of the wire J are bent to the right and left at the end of the shank, and are passed through holes in the binding L at the rear side of the box, as shown at N, after which the ends are clinched down upon the inside of the binding, as indicated at P.

The cover B is attached to the box A by means of a piece of wire, Q, the ends of which are passed through holes in the bindings L and L', and bent so as to form ring-hinges R.

The central part of the wire Q is held between the wires I and J, as shown in fig. 4.

By this method of construction a very firm and stiff connection is obtained between the popper-box and handle.

It will be seen from the foregoing description that the handle can be removed from the screw G, while the latter remains securely attached to the popper-box A.

The front end of the shank C may be made in a different manner from that shown in the drawing, provided it is so made that it can be securely attached to the popper-box.

Having described my improvements in corn-poppers,

What I claim therein as new and of my invention, and desire to secure by Letters Patent, is—

1. The peculiarly-constructed screw-shank attachment C D E G, substantially as shown and described.

2. The combination of the screw-shank attachment with the popper-box or wires I and J, substantially as and for the purposes set forth.

WM. F. COLLIER.

Witnesses:
    THOS. H. DODGE,
    A. E. PEIRCE.